United States Patent
Li et al.

(10) Patent No.: US 11,525,030 B2
(45) Date of Patent: Dec. 13, 2022

(54) METHOD FOR PREPARING BIOGENIC GUANIDINE COMPLEX, METHOD FOR PREPARING POLYETHYLENE TEREPHTHALATE (PET), AND METHOD FOR PREPARING POLY (ETHYLENE ISOPHTHALATE-CO-TEREPHTHALATE) (PEIT)

(71) Applicant: Polytex Chemical Engineering Co., Ltd., Yangzhou (CN)

(72) Inventors: Hong Li, Yangzhou (CN); Dubin Wang, Yangzhou (CN)

(73) Assignee: POLYTEX CHEMICAL ENGINEERING CO., LTD., Yangzhou (CN)

( * ) Notice: Subject to any disclaimer, the term of this patent is extended or adjusted under 35 U.S.C. 154(b) by 259 days.

(21) Appl. No.: 17/033,787

(22) Filed: Sep. 26, 2020

(65) Prior Publication Data
US 2022/0033577 A1 Feb. 3, 2022

(30) Foreign Application Priority Data
Aug. 2, 2020 (CN) .......................... 202010764178.9

(51) Int. Cl.
*C08G 63/81* (2006.01)
*C08G 63/183* (2006.01)
*C08G 63/78* (2006.01)
*C08G 63/90* (2006.01)
*C08L 67/03* (2006.01)

(52) U.S. Cl.
CPC ........... *C08G 63/81* (2013.01); *C08G 63/183* (2013.01); *C08G 63/785* (2013.01); *C08G 63/90* (2013.01); *C08L 67/03* (2013.01); *C08J 2367/03* (2013.01)

(58) Field of Classification Search
CPC ...... C07F 15/025; C07F 3/003; C08G 63/183; C08G 63/785; C08G 63/81; C08G 63/826; C08G 63/83; C08G 63/90; C08J 2367/03; C08L 67/03
See application file for complete search history.

(56) References Cited

U.S. PATENT DOCUMENTS

| | | | | |
|---|---|---|---|---|
| 2,259,063 A | * | 10/1941 | Davis | C07C 277/08 556/176 |
| 3,254,054 A | * | 5/1966 | Boerma | C08G 63/87 560/92 |
| 8,309,618 B2 | * | 11/2012 | Hedrick | C07C 67/03 528/495 |
| 8,367,796 B2 | * | 2/2013 | Hedrick | C08G 63/183 528/308.1 |
| 8,921,509 B2 | * | 12/2014 | Liu | C08G 63/78 502/103 |
| 9,688,811 B2 | * | 6/2017 | Li | C08G 63/16 |
| 9,896,539 B2 | * | 2/2018 | Li | C08G 63/80 |
| 2022/0033577 A1 | * | 2/2022 | Li | C08L 67/03 |

OTHER PUBLICATIONS

Xi-Yang Cui et al "Metal-catalysed reactions enabled by guanidine type ligands", Org. Biomol. Chem., 2019, 17, 4689 (Year: 2019).*
Julia Stanek et al "Guanidine Metal Complexes for Bioinorganic Chemistry and Polymerisation Catalysis", 2017 (Year: 2017).*
Janna Borner et al "[Bis(guanidine)]zinc Complexes and Their Application in Lactide Polymerisation", Eur. J. Inorg. Chem. 2007, 5645-5651 (Year: 2007).*

* cited by examiner

*Primary Examiner* — Frances Tischler
*Assistant Examiner* — Gennadiy Mesh
(74) *Attorney, Agent, or Firm* — Matthias Scholl P.C.; Matthias Scholl

(57) ABSTRACT

A method for preparing a biogenic guanidine complex, the method including: mixing dimethyl sulfoxide (DMSO) with water in a volume ratio thereof of 1:1 to yield a solvent DMSO-$H_2O$; adding organic guanidine (G) and a compound $MX_2$ in a molar ratio G/$MX_2$=1:1 or 2:1 to the solvent DMSO-$H_2O$, where the organic guanidine (G) is selected from arginine (Arg), guanidinoacetic acid (Gaa), creatine (Cra), creatinine (Cran), guanine (Gua), and agmatine (Agm); M represents $Fe^{2+}$, $Mg^{2+}$, or $Zn^{2+}$; and X represents $Cl^-$, $CH_3COO^-$, or $CH_3CH(OH)COO^-$; stirring the solvent DMSO-$H_2O$ containing the organic guanidine and the compound $MX_2$; recycling the solvent DMSO-$H_2O$ through vacuum distillation and obtaining a solid; transferring the solid to a Buchner funnel, and washing the solid with deionized water and ethanol consecutively; and removing the deionized water and ethanol through vacuum filtration, and drying the solid. Biogenic guanidine complex can be used for production of Polyethylene terephthalate or Poly (ethylene isophthalate-co-terephthalate).

5 Claims, No Drawings

METHOD FOR PREPARING BIOGENIC GUANIDINE COMPLEX, METHOD FOR PREPARING POLYETHYLENE TEREPHTHALATE (PET), AND METHOD FOR PREPARING POLY (ETHYLENE ISOPHTHALATE-CO-TEREPHTHALATE) (PEIT)

CROSS-REFERENCE TO RELATED APPLICATIONS

Pursuant to 35 U.S.C.§ 119 and the Paris Convention Treaty, this application claims foreign priority to Chinese Patent Application No. 202010764178.9 filed Aug. 2, 2020, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to a method for preparing a biogenic guanidine complex, a method for preparing polyethylene terephthalate (PET), and a method for preparing poly(ethylene isophthalate-co-terephthalate)(PEIT).

Polyethylene terephthalate (also written poly(ethylene terephthalate)), commonly abbreviated PET, PETE, is a common thermoplastic polymer resin of the polyester family and is used in fibers for clothing, containers for liquids and foods, thermoforming for manufacturing, and in combination with glass fiber for engineering resins.

In the related art, the production of PET employs antimony such as ethylene glycol antimony or antimony trioxide as a catalyst. However, the antimony compounds are toxic to cells. Therefore, the PET products produced with an antimony catalyst pose a threat to the ecological environment and human health.

SUMMARY

The disclosure provides a method for preparing a biogenic guanidine complex, the method comprising:
  mixing dimethyl sulfoxide (DMSO) with water in a volume ratio thereof of 1:1 to yield a solvent DMSO-$H_2O$;
  adding organic guanidine (G) and a compound $MX_2$ in a molar ratio $G/MX_2=1:1$ or 2:1 to the solvent DMSO-$H_2O$, wherein the organic guanidine (G) is selected from arginine (Arg), guanidinoacetic acid (Gaa), creatine (Cra), creatinine (Cran), guanine (Gua), and agmatine (Agm); M represents $Fe^{2+}$, $Mg^{2+}$, or $Zn^{2+}$; and X represents $Cl^-$, $CH_3COO^-$, or $CH_3CH(OH)COO^-$;
  under nitrogen protection, stirring the solvent DMSO-$H_2O$ containing the organic guanidine (G) and the compound $MX_2$ at a temperature of 25-95° C. for 8-12 hours;
  recycling the solvent DMSO-$H_2O$ through vacuum distillation and obtaining a solid; transferring the solid to a Buchner funnel, and washing the solid with deionized water and ethanol consecutively; and
  removing the deionized water and ethanol through vacuum filtration, and drying the solid at 60° C. for 12-14 hours, to yield a guanidine complex $GMX_2/G_2MX_2$, with a yield of ≥98%.

The process chart of the method is as follows:

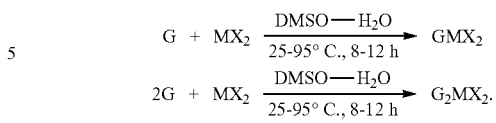

The disclosure also provides a method for preparing polyethylene terephthalate (PET), the method comprising:
  adding to a reactor, terephthalic acid (TA), ethylene glycol (EG), and guanidine complex $GMX_2/G_2X_2$ in a molar ratio $TA:EG:GMX_2/G_2MX_2=1.0:1.3:2.0-3.0)\times 10^{-5}$, where G represents arginine (Arg), guanidinoacetic acid (Gaa), creatine (Cra), creatinine (Cran), guanine (Gua), or agmatine (Agm); M represents $Fe^{2+}$, $Mg^{2+}$, or $Zn^{2+}$; and X represents $Cl^-$, $CH_3COO^-$, or $CH_3CH(OH)COO^-$;
  purging the reactor with nitrogen until a pressure of the reactor is 150 kPa; holding the pressure at 220-244° C. for 2.0-2.5 hours; reducing the pressure to 10 kPa, and holding the pressure at 245-257° C. for 40-45 min; further reducing the pressure to 1 kPa, and holding the pressure at 258-264° C. for 30-35 min; reducing the pressure to 5 Pa, and holding the pressure at 265-268° C. for 40-45 min; and
  collecting a product in the reactor, pelleting the product, and drying to yield polyethylene terephthalate (PET).

The process chart of preparing PET is as follows:

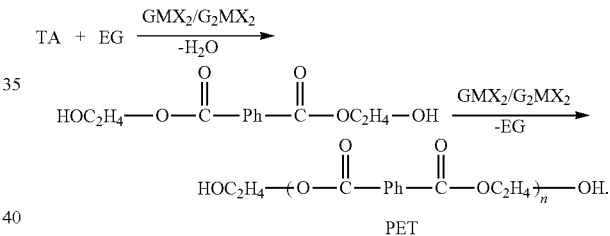

Also provides is a method for preparing poly (ethylene isophthalate-co-terephthalate) (PEIT), the method comprising:
  adding to a reactor terephthalic acid (TA), isophthalic acid (IPA), ethylene glycol (EG), and guanidine complex $GMX_2/G_2X_2$ in a molar ratio of $0.98:0.02:1.30:(2.0-3.0)\times 10^{-5}$, where G represents arginine (Arg), guanidinoacetic acid (Gaa), creatine (Cra), creatinine (Cran), guanine (Gua), or agmatine (Agm); M represents $Fe^{2+}$, $Mg^{2+}$, or $Zn^{2+}$; and X represents $Cl^-$, $CH_3COO^-$, or $CH_3CH(OH)COO^-$;
  purging the reactor with nitrogen until a pressure of the reactor is 150 kPa; holding the pressure at 220-244° C. for 2.0-2.5 hours; reducing the pressure to 10 kPa, and holding the pressure at 245-257° C. for 40-45 min; further reducing the pressure to 1 kPa, and holding the pressure at 258-264° C. for 30-35 min; reducing the pressure to 5 Pa, and holding the pressure at 265-268° C. for 40-45 min; and
  collecting a product in the reactor, pelleting the product, and drying to yield poly(ethylene isophthalate-co-terephthalate) (PEIT).

The process chart of preparing PEIT is as follows, where Ph represents 1,4-phenylene, and mPh represent 1,3-phenylene:

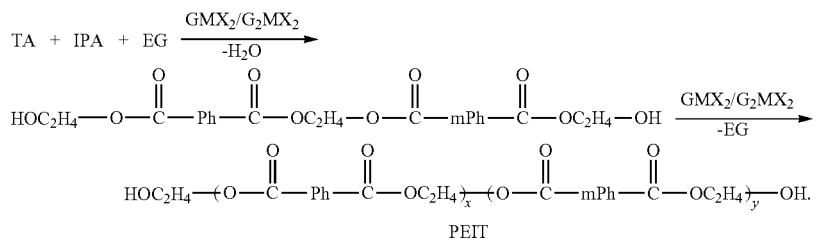

PEIT

The prepared PET or PEIT has the following characteristic parameters: intrinsic viscosity ≥0.675 DL/g, melting point ≥257° C., carboxyl end group content 24±4 mole/T, L value of chromaticity ≥80, b value of chromaticity is 1.5±1.5.

DETAILED DESCRIPTION

To further illustrate, embodiments detailing a method for preparing a biogenic guanidine complex, a method for preparing polyethylene terephthalate (PET), and a method for preparing poly (ethylene isophthalate-co-terephthalate) (PEIT) are described below. It should be noted that the following embodiments are intended to describe and not to limit the disclosure.

Example 1 Preparation of Guanidine Complex $(Gaa)FeCl_2$

To a reactor equipped with a mechanical stirrer, a reflux condenser and a thermometer, 300 mL of a mixed solution DMSO-$H_2O$ (DMSO:$H_2O$=1:1, V/V), 0.01 mole (1.17 g) of guanidinoacetic acid (Gaa), and 0.01 mole (1.27 g) of $FeCl_2$ were added. The reactor was filled with nitrogen. Under nitrogen protection, the mixture in the reactor was continuously stirred for 8.0 hours at 25±1° C. Thereafter, the solvent DMSO-$H_2O$ was recycled through vacuum distillation for later use. A solid was obtained in the reactor and dried at 60° C. for 12 hours in a vacuum oven, to yield a guanidine complex $(Gaa)FeCl_2$, with a yield of 98.1%.

Example 2 Preparation of Guanidine Complex $(Gaa)_2FeCl_2$

The reaction conditions in this example are basically the same as that in Example 1, except that 0.02 mole (2.34 g) of guanidinoacetic acid (Gaa) and 0.01 mole (1.27 g) of $FeCl_2$ were added. The yield of guanidine complex $(Gaa)_2FeCl_2$ was 98.3%.

Example 3 Preparation of Guanidine Complex $(Cra)Mg(OAc)_2$

The reaction conditions in this example are basically the same as that in Example 1, except that 0.01 mole (1.31 g) of creatine (Cra) and 0.01 mole (1.42 g) of $Mg(OAc)_2$ were added. The reaction temperature was 60±1° C., and the reaction time was 9.0 hours. The yield of guanidine complex $(Cra)Mg(OAc)_2$ was 98.2%.

Example 4 Preparation of Guanidine Complex $(Cra)_2Mg(OAc)_2$

The reaction conditions in this example are basically the same as that in Example 3, except that 0.02 mole (2.62 g) of creatine (Cra) and 0.01 mole (1.42 g) of $Mg(OAc)_2$ were added. The yield of guanidine complex $(Cra)_2Mg(OAc)_2$ was 98.5%.

Example 5 Preparation of Guanidine Complex $(Gua)Zn(OLa)_2$

The reaction conditions in this example are basically the same as that in Example 1, except that 0.01 mole (1.51 g) of guanine (Gua) and 0.01 mole (2.44 g) of $Zn(OLa)_2$ were added. The reaction temperature was 94±1° C., and the reaction time was 12.0 hours. The yield of guanidine complex $(Gua)Zn(OLa)_2$ was 98.4%.

Example 6 Preparation of Guanidine Complex $(Gua)_2 Zn(OLa)_2$

The reaction conditions in this example are basically the same as that in Example 5, except that 0.02 mole (3.02 g) of guanine (Gua) and 0.01 mole (2.44 g) of $Zn(OLa)_2$ were added. The yield of guanidine complex $(Gua)_2Zn(OLa)_2$ was 98.2%.

Example 7 Preparation of Guanidine Complex $(Cran)Zn(OLa)_2$

The reaction conditions in this example are basically the same as that in Example 1, except that 0.01 mole (1.13 g) of creatinine (Cran) and 0.01 mole (2.44 g) of $Zn(OLa)_2$ were added. The reaction temperature was 38±1° C., and the reaction time was 8.5 hours. The yield of guanidine complex $(Cran)Zn(OLa)_2$ was 98.1%.

Example 8 Preparation of Guanidine Complex $(Cran)_2Zn(OLa)_2$

The reaction conditions in this example are basically the same as that in Example 7, except that 0.02 mole (2.26 g) of creatinine (Cran) and 0.01 mole (2.44 g) of $Zn(OLa)_2$ were added. The yield of guanidine complex $(Cran)_2Zn(OLa)_2$ was 98.0%.

Example 9 Preparation of PET Using Guanidine Complex $(Gaa)FeCl_2$

To a high-pressure reactor equipped with an electric mechanical stirrer, a distillation column, a thermometer and a pressure-vacuum gauge, 60 mole (9.97 kg) of terephthalic acid (TA), 78 mole (4.84 kg) of ethylene glycol (EG), and 1.8 mmole (439 mg) of guanidine complex $(Gaa)FeCl_2$ prepared in Example 1 were added. The reactor was filled with nitrogen until the pressure in the reactor was 150 kPa. The temperature of the heating oil was set at 250° C., and the temperature in the reactor increased gradually under continuous stirring. When the temperature in the reactor reached 220° C., an esterification (dehydration) reaction began. With the removal of water, the esterification reaction continued, and the temperature in the reactor gradually increased. The esterification reaction was completed when the temperature in the reactor was 244° C. The total esterification time was 2.2 hours. Following the esterification reaction, a polycondensation reaction started. The pressure in the reactor was reduced to 10 kPa, and the temperature in the reactor was controlled at 245-257° C. for 42 min (that is, the polycondensation reaction started at 245° C. With the progress of polycondensation, the temperature in the reactor increased continuously, and the temperature in the reactor reached 257° C. after 42 min of reaction). Then, the pressure in the reactor was reduced to 1.0 kPa, and the temperature in the reactor was controlled at 258-264° C. for 32 min (that is, the temperature in the reactor rose from 258° C. to 264° C. within 32 min). Thereafter, the pressure in the reactor was reduced to 5 Pa, and the temperature in the reactor was controlled at 265-268° C. for 48 min (that is, the temperature in the reactor rose from 265° C. to 268° C. within 48 min). The product in the reactor was collected under nitrogen protection, pelleted, and dried to yield 12.12 kg of polyethylene terephthalate (PET).

Example 10 Preparation of PET Using Guanidine Complex (Gaa)$FeCl_2$

The reaction conditions in this example are basically the same as that in Example 9, except that 58.8 mole (9.77 kg) of terephthalic acid (TA), 1.20 mole (0.20 kg) of isophthalic acid (IPA), 78 mole (4.84 kg) of ethylene glycol (EG), and 1.8 mmole (439 mg) of guanidine complex (Gaa)$FeCl_2$ were added to the reactor. And 12.10 kg of PEIT was prepared.

Example 11 Preparation of PET Using Guanidine Complex (Gaa)$_2FeCl_2$

The reaction conditions in this example are basically the same as that in Example 9, except that 60 mole (9.97 kg) of terephthalic acid (TA), 78 mole (4.84 kg) of ethylene glycol (EG), and 1.2 mmole (433.2 mg) of guanidine complex (Gaa)$_2FeCl_2$ prepared in Example 2 were added. Esterification reaction time: 2.0 hours; polycondensation reaction conditions: 10 kPa, 245-257° C. for 41 min; 1.0 kPa, 258-264° C. for 31 min; 5pa, 265-268° C. for 47 min. And 12.16 kg of PET was prepared.

Example 12 Preparation of PET Using Guanidine Complex (Gaa)$_2FeCl_2$

The reaction conditions in this example are basically the same as that in Example 11, except that except that 58.8 mole (9.77 kg) of terephthalic acid (TA), 1.20 mole (0.20 kg) of isophthalic acid (IPA), 78 mole (4.84 kg) of ethylene glycol (EG), and 1.2 mmole (433.2 mg) of guanidine complex (Gaa)$_2FeCl_2$ prepared in Example 2 were added to the reactor. And 12.14 kg of PEIT was prepared.

Example 13 Preparation of PET Using Guanidine Complex (Cra)Mg(OAc)$_2$

The reaction conditions in this example are basically the same as that in Example 9, except that 60 mole (9.97 kg) of terephthalic acid (TA), 78 mole (4.84 kg) of ethylene glycol (EG), and 1.8 mmole (492.3 mg) of guanidine complex (Cra)Mg(OAc)$_2$ prepared in Example 3 were added. Esterification reaction time: 2.2 hours; polycondensation reaction conditions: 10 kPa, 245-257° C. for 43 min; 1.0 kPa, 258-264° C. for 33 min; 5 Pa, 265-268° C. for 49 min. And 12.20 kg of PET was prepared.

Example 14 Preparation of PET Using Guanidine Complex (Cra)Mg(OAc)$_2$

The reaction conditions in this example are basically the same as that in Example 13, except that except that 58.8 mole (9.77 kg) of terephthalic acid (TA), 1.20 mole (0.20 kg) of isophthalic acid (IPA), 78 mole (4.84 kg) of ethylene glycol (EG), and 1.8 mmole (492.3 mg) of guanidine complex (Cra)Mg(OAc)$_2$ prepared in Example 3 were added to the reactor. And 12.02 kg of PEIT was prepared.

Example 15 Preparation of PET Using Guanidine Complex (Cra)$_2$Mg(OAc)$_2$

The reaction conditions in this example are basically the same as that in Example 9, except that 60 mole (9.97 kg) of terephthalic acid (TA), 78 mole (4.84 kg) of ethylene glycol (EG), and 1.2 mmole (485.6 mg) of guanidine complex (Cra)$_2$Mg(OAc)$_2$ prepared in Example 4 were added. Esterification reaction time: 2.4 hours; polycondensation reaction conditions: 10 kPa, 245-257° C. for 45 min; 1.0 kPa, 258-264° C. for 34 min; 5 Pa, 265-268° C. for 50 min. And 12.28 kg of PET was prepared.

Example 16 Preparation of PET Using Guanidine Complex (Cra)$_2$Mg(OAc)$_2$

The reaction conditions in this example are basically the same as that in Example 15, except that except that 58.8 mole (9.77 kg) of terephthalic acid (TA), 1.20 mole (0.20 kg) of isophthalic acid (IPA), 78 mole (4.84 kg) of ethylene glycol (EG), and 1.2 mmole (485.6 mg) of guanidine complex (Cra)$_2$Mg(OAc)$_2$ prepared in Example 4 were added to the reactor. And 12.18 kg of PEIT was prepared.

Example 17 Preparation of PET Using Guanidine Complex (Gua)Zn(OLa)$_2$

The reaction conditions in this example are basically the same as that in Example 9, except that 60 mole (9.97 kg) of terephthalic acid (TA), 78 mole (4.84 kg) of ethylene glycol (EG), and 1.8 mmole (710.4 mg) of guanidine complex (Cra)$_2$Mg(OAc)$_2$ prepared in Example 5 were added. Esterification reaction time: 2.5 hours; polycondensation reaction conditions: 10 kPa, 245-257° C. for 45 min; 1.0 kPa, 258-264° C. for 35 min; 5 Pa, 265-268° C. for 55 min. And 11.90 kg of PET was prepared.

Example 18 Preparation of PET Using Guanidine Complex (Gua)Zn(OLa)$_2$

The reaction conditions in this example are basically the same as that in Example 17, except that except that 58.8 mole (9.77 kg) of terephthalic acid (TA), 1.20 mole (0.20 kg) of isophthalic acid (IPA), 78 mole (4.84 kg) of ethylene glycol (EG), and 1.8 mmole (710.4 mg) of guanidine complex (Cra)$_2$Mg(OAc)$_2$ prepared in Example 5 were added to the reactor. And 11.80 kg of PEIT was prepared.

Following the preparation processes taught in Example 1-8, the guanidine complexes selected but not limited to, (Cran)FeCl$_2$, (Cran)Fe(OAc)$_2$, (Arg)Mg(OAc)$_2$, (Arg)Mg(OLa)$_2$, (Agm)Zn(OLa)$_2$, (Agm)FeCl$_2$, (Agm)Mg(OAc)$_2$ can also be prepared. Following the synthesis processes detailed in Examples 9-18, under appropriate esterification reaction time, polycondensation reaction pressure and reaction time, the PET and PEIT polyester products can be successfully synthesized.

The following advantages are associated with the method of disclosure:

1. The guanidine complexes contain no antimony and can be used as a catalyst for preparation of PET and PEIT, exhibiting environmental and biological safety.

2. The catalyst has high selectivity, good polymerization controllability, few side reactions, and the prepared PET and PEIT has excellent performance.

3. The guanidine complexes as a catalyst exhibit catalytic activity and use stability. The synthesis of the PET and PEIT polyester with the catalyst can be completed under relatively mild and energy-saving reaction conditions: low reaction temperature (esterification at 220-244° C., polycondensation at 245-268° C.); short reaction time (esterification within 2.0-2.5 hours, polycondensation within 115-135 min).

It will be obvious to those skilled in the art that changes and modifications may be made, and therefore, the aim in the appended claims is to cover all such changes and modifications.

What is claimed is:

1. A method, comprising:
mixing dimethyl sulfoxide (DMSO) with water in a volume ratio thereof of 1:1 to yield a solvent DMSO-$H_2O$;
adding a biogenic organic guanidine (G) and a compound $MX_2$ in a molar ratio $G/MX_2=1:1$ or $2:1$ to the solvent DMSO-$H_2O$, wherein the organic guanidine (G) is selected from arginine (Arg), guanidinoacetic acid (Gaa), creatine (Cra), creatinine (Cran), guanine (Gua), and agmatine (Agm); M represents $Fe^{2+}$, $Mg^{2+}$, or $Zn^{2+}$; and X represents $Cl^-$, $CH_3COO^-$, or $CH_3CH(OH)COO^-$;
under nitrogen protection, stirring the solvent DMSO-$H_2O$ containing the organic guanidine (G) and the compound $MX_2$ at a temperature of 25-95° C. for 8-12 hours;
recycling the solvent DMSO-$H_2O$ through vacuum distillation and obtaining a solid; transferring the solid to a Buchner funnel, and washing the solid with deionized water and ethanol consecutively; and
removing the deionized water and ethanol through vacuum filtration, and drying the solid at 60° C. for 12-14 hours, to yield a guanidine complex $GMX_2/G_2MX_2$, with a yield of ≥98%;
a process chart of the method being as follows:

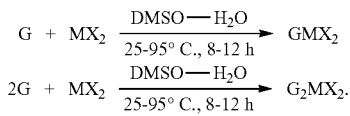

2. A method, comprising:
adding to a reactor, terephthalic acid (TA), ethylene glycol (EG), and guanidine complex $GMX_2/G_2X_2$ in a molar ratio $TA:EG:GMX_2/G_2MX_2=1.0:1.3:(2.0-3.0)\times10^{-5}$, wherein G represents arginine (Arg), guanidinoacetic acid (Gaa), creatine (Cra), creatinine (Cran), guanine (Gua), or agmatine (Agm); M represents $Fe^{2+}$, $Mg^{2+}$, or $Zn^{2+}$; and X represents $Cl^-$, $CH_3COO^-$, or $CH_3CH(OH)COO^-$;
purging the reactor with nitrogen until a pressure of the reactor is 150 kPa; holding the pressure at 220-244° C. for 2.0-2.5 hours; reducing the pressure to 10 kPa, and holding the pressure at 245-257° C. for 40-45 min; further reducing the pressure to 1 kPa, and holding the pressure at 258-264° C. for 30-35 min; reducing the pressure to 5 Pa, and holding the pressure at 265-268° C. for 40-45 min; and
collecting a product in the reactor, pelleting the product, and drying to yield polyethylene terephthalate (PET);
a process chart of the method being as follows:

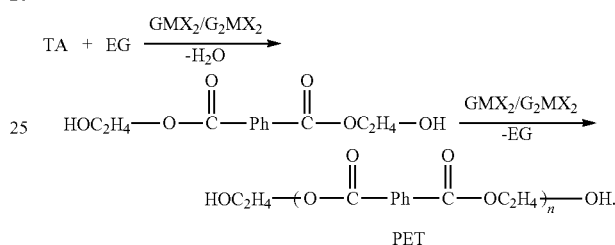

3. The method of claim 2, wherein the PET has the following characteristic parameters: intrinsic viscosity ≥0.675 DL/g, melting point ≥257° C., carboxyl end group content 24±4 mole/T, L value of chromaticity ≥80, b value of chromaticity is 1.5±1.5.

4. A method, comprising:
adding to a reactor terephthalic acid (TA), isophthalic acid (IPA), ethylene glycol (EG), and guanidine complex $GMX_2/G_2MX_2$ in a molar ratio of $0.98:0.02:1.30:(2.0-3.0)\times10^{-5}$, wherein G represents arginine (Arg), guanidinoacetic acid (Gaa), creatine (Cra), creatinine (Cran), guanine (Gua), or agmatine (Agm); M represents $Fe^{2+}$, $Mg^{2+}$, or $Zn^{2+}$; and X represents $Cl^-$, $CH_3COO^-$, or $CH_3CH(OH)COO^-$;
purging the reactor with nitrogen until a pressure of the reactor is 150 kPa; holding the pressure at 220-244° C. for 2.0-2.5 hours; reducing the pressure to 10 kPa, and holding the pressure at 245-257° C. for 40-45 min; further reducing the pressure to 1 kPa, and holding the pressure at 258-264° C. for 30-35 min; reducing the pressure to 5 Pa, and holding the pressure at 265-268° C. for 40-45 min; and
collecting a product in the reactor, pelleting the product, and drying to yield poly(ethylene isophthalate-co-terephthalate) (PEIT);
a process chart of the method being as follows, wherein Ph represents 1,4-phenylene, and mPh represent 1,3-phenylene:

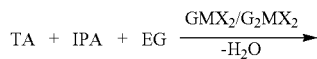

-continued
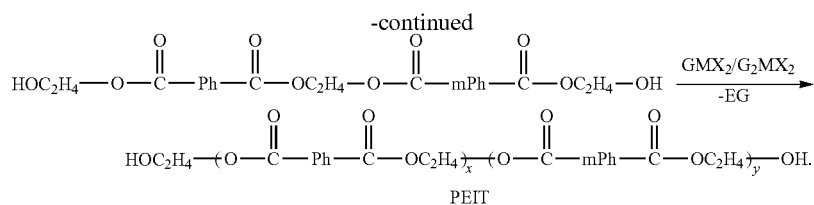
PEIT
5. The method of claim 4, wherein the PEIT has the following characteristic parameters: intrinsic viscosity ≥0.675 DL/g, melting point ≥257° C., carboxyl end group content 24±4 mole/T, L value of chromaticity ≥80, b value of chromaticity is 1.5±1.5.
* * * * *